United States Patent [19]
Shimp et al.

[11] Patent Number: 5,965,102
[45] Date of Patent: Oct. 12, 1999

[54] METHOD OF MANUFACTURING FUSED-MAGNESIA

[76] Inventors: Harry B. Shimp, 30 Sterncrest Dr., Chagrin Falls, Ohio 44022; Charles W. Keller, 136 Magnolia Dr., Greeneville, Tenn. 47743; Steve M. White, 1800 Canterbury Dr., Morristown, Tenn. 37814

[21] Appl. No.: 08/977,398

[22] Filed: Nov. 24, 1997

[51] Int. Cl.⁶ .................................................. C01F 5/02
[52] U.S. Cl. ............................................ 423/636; 423/635
[58] Field of Search .................................... 423/635, 636, 423/155, 170; 23/308 R, 313 R

[56] References Cited

U.S. PATENT DOCUMENTS 3,786,129  1/1974  Kawabe ................................... 423/635

FOREIGN PATENT DOCUMENTS 39-25545  11/1964  Japan ..................................... 423/635
43-12433   5/1968  Japan ..................................... 423/636
 3-37113   2/1991  Japan ..................................... 423/636

Primary Examiner—Steven Bos
Attorney, Agent, or Firm—John F. McDevitt

[57] ABSTRACT

Undersize particles are recovered from a conventional manufacturing process commonly employed to prepare fused magnesia crystals. The recovery hydrolizes a bulk mass of the collected undersize particles causing fracture to eventually occur in the bulk mass and thereafter fuses the agglomerated material in an electric arc furnace.

2 Claims, 1 Drawing Sheet

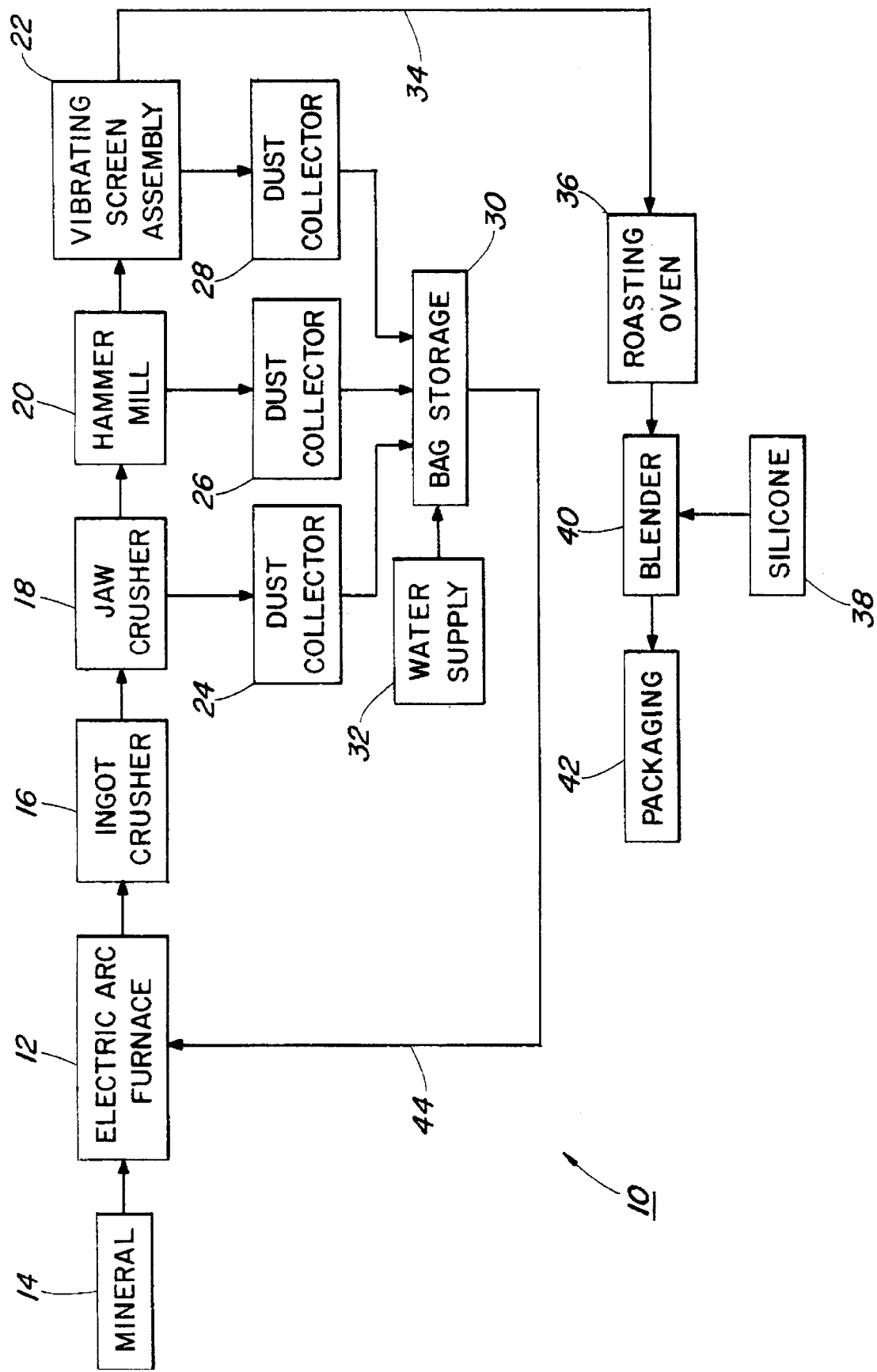

METHOD OF MANUFACTURING FUSED-MAGNESIA

BACKGROUND OF THE INVENTION

This invention relates generally to a method for recovery of undersize crystalline particulates requiring hydrolysis of the particular crystalline material being employed and more particularly for the treatment of undersized fused magnesia particles in this manner in order to develop a larger particle size upon subsequent processing.

Fused magnesia particulates are conventionally produced in an electric arc furnace forming a solid ingot from the molten starting material which is thereafter mechanically crushed and ground by various means to a final desired particle size. The further conventional crushing and grinding processes being employed produces a particle size averaging around 30 mesh United States screen size accompanied by considerable magnesia dust having a particle size no greater than approximately 250 mesh United States screen size. The dust by-product cannot thereafter be reclaimed by refusion in the arc-type furnace being employed due to its light fluffy condition which effectively resists any further physical agglomeration as well as being too easily blown out of the fusion vessel by the hot gases accompanying furnace operation. The fine dust material also allows molten magnesia to migrate away from the hot zone in the fusion vessel which can result in damage of the vessel walls and with such damage to the fusion vessel further occasioning a violent expulsion of molten magnesia to the surroundings.

A wide assortment of fused magnesia products can be manufactured in the foregoing manner to include various types and grades for dissimilar end use applications. To further illustrate such diversity, this material is now commonly employed in electrical heating elements, refractory structures, and friction brake constructions. The electrical grade material for heating elements typically ranges in magnesia purity from at least 50 weight percent up to at least 98 weight percent, with a grain size ranging from approximately 20 to 40 weight percent in the size range –40 mesh United States screen size, while further exhibiting required electrical resistance and thermal conductivity characteristics. A still further requirement for said electrical heating element applications is mechanical flow of the fused magnesia particulates when filling the metal casings employed for said elements which can be enhanced by coating the magnesia particles with a solid or liquid lubricant, such as a silicone and the like. As distinct therefrom, a typical fused magnesia product for refractory structures such as bricks and blocks maintains a relatively high purity magnesia content in the 95–98 weight percent range together with a particle size range from 80–2,000 microns. The physical properties commonly specified for fused magnesia products to replace asbestos in friction brake constructions includes high temperature stability and Mohs hardness of at least 5. To satisfy these requirements, a typical product ranges in magnesia content from approximately 90–99 weight percent with a particle size in the –40+60 mesh United States screen size from approximately 25–35 weight percent.

A fused magnesia product suitable for electrical heating elements can be produced in the above manner utilizing a conventional submerged arc electric furnace of the general type long employed for steel-melting. Electric heating is supplied with single or multiple electrodes to establish a reaction zone within the fusion vessel where the mineral charge becomes melted. In doing so, fusion can commence upon a batch charge already present in the furnace vessel with additional mineral batches being charged during the fusion process. When the charged material has been converted to a molten state, the applied electrical power is terminated allowing the furnace contents to cool providing a solid ingot with varying degrees of crystalline formation. The furnace ingot is subsequently crushed by conventional mechanical means such as with a jaw crusher followed by a hammer mill which can still further include magnetic separation means to remove any entrained metal contaminants. A conventional vibrating screen apparatus is next employed to provide the desired particle size from the crushed material while further yielding at least 5 weight percent undersize particles passing through 325 mesh United States screen size. The desired particle size material is then heated in an oxidizing atmosphere to approximately 1000° C. for additional impurity removal and optionally blended with a suitable lubricant to provide a free–flowing powder having the above defined electrical and physical characteristics suitable for heating element utilization. Accordingly, it remains desirable to recover the undersized fused magnesia particles resulting from the aforementioned crushing and grinding processes so as to reduce environmental problems caused by dust escape in the manufacturing plant as well as significantly increase the yield of usable product being manufactured.

It is one object of the present invention, therefore, to provide effective means whereby undersize fused magnesia particulates can be converted to larger size particles.

It another object of the present invention to provide novel treatment means enabling fused magnesia particles no greater than approximately 250 mesh United States screen size to be effectively reprocessed into a larger particle size polycrystalline product.

Still another object of the present invention is to provide a novel method for recovery of undersized fused magnesia particulates so as to increase product yield from the starting material.

These and still further objects of the present invention will become apparent upon considering the following detailed description of the present invention.

SUMMARY OF THE INVENTION

Novel means have now been discovered to convert dust size particles of fused magnesia to a large particle size now customarily being employed in numerous distinct end product applications. More particularly, fused magnesia particles no greater than approximately 250 mesh United States screen size are collected into a bulk mass for hydration of the magnesia particles with an aqueous liquid and with said hydration treatment causing fractures in the bulk mass of material so as to produce agglomerates, said agglomerates thereafter being refused in an electric arc furnace. Subsequent pulverizing of the refused magnesia product in the customary manner produces larger size particles having the desired particle size. In one embodiment for recovery of such dust size magnesia particles, said material is collected in a fabric storage bag and water is percolated throughout the collected material in an amount from approximately 5 weight percent up to approximately 50 weight percent with several days being allowed to elapse for break up of the hydrated material into relatively large size chunks. Such product can be directly charged to the electric arc furnace for remelting and subsequent size reduction again all carried out in a conventional manner. While no thorough investigation has yet been conducted regarding the mechanism causing such unexpected fracture in the bulk mass of hydrated magnesia, it is believed attributable to the exothermic nature of the known chemical reaction taking place. A relative confinement of the heat being generated over a time period ranging from several days or longer to the mass of collected material itself is felt responsible for the observed fracturing behavior.

In a further representative embodiment for preparation of fused magnesia particulates suitable for electrical heating element products in the foregoing manner, the dust size fused magnesia particulates are first collected in a woven polyethylene bag, commercially sold by IFB Corporation under the trade designation "BULK BAG" or "SUPER-SACK" and both of said storage containers having a flexible porous construction. Such containers have a capacity to store 50 to 5000 pounds of the dust material and include a bottom discharge opening for bag unloading. Water is uniformly introduced into a bag already containing the collected dust material without further need of additional mechanical mixing and sufficient time is thereafter allowed to elapse for the bulk mass of hydrated material to undergo fracture producing material chunks of a size suitable for direct introduction to the electric arc furnace employed for the original fusion. Refusion of the material chunks in a similar manner as originally employed again produced a solid ingot having various degrees of crystalline formation for subsequent size reduction with conventional mechanical means. The size reduction included material passage through jaw crusher and hammer mill apparatus for final size separation in a conventional vibrating screen unit which produced about 20 to 40 weight percent refused magnesia particles in the −40+60 particle size range. The sized particles were subsequently reheated to approximately 1000° C. in an oxidizing atmosphere to remove any further processing contaminants and thereafter optionally blended with a suitable silicone resin to produce a final free flowing powder exhibiting a typical electrical resistance value in the range from 250–500 megohm inches at 48 watts/square inch applied energy.

BRIEF DESCRIPTION OF THE DRAWING

The accompanying drawing is a material flow chart depicting representative processing equipment employed for practice of the present recovery method.

DETAILED DESCRIPTION OF THE PREFERRED EMBODIMENTS

Referring to the accompanying drawing, there is depicted representative process equipment for recovery of undersized fused magnesia particles according to the present method and which can thereafter prove suitable for use in electrical heating elements. More particularly, said drawing represents a material flow chart utilizing conventional manufacturing equipment for sequential fusion and size reduction of a typical magnesia mineral together with recovery of the undersize fused magnesia resulting therefrom with reprocessing of said undersize by-product being carried out in the same equipment. Said flow chart 10 utilizes a conventional electric arc furnace 12 for initial fusion of the charged mineral 14 to form a solid ingot product which is required to be crushed by ordinary mechanical means 16 after sufficient time has elapsed for cooling. A conventional jaw crusher 18 is next utilized to further reduce the size of the relatively large chunks of fused magnesia material produced upon ingot breakup. Still further size reduction of said fused magnesia material is next carried out with a conventional hammer mill 20 to provide a particle size distribution suitable for separation in a conventional vibrating screen assembly unit 22 in order to furnish a particle size material found useful in the subsequent manufacture of heating element articles. Conventional dust collection means 24, 25 and 26 are further individually connected to said jaw crusher, hammer mill and vibrating screen means so that the considerable dust size by-product being produced in all said equipment is not permitted to escape into the surrounding environment. As can be noted from said drawing, the recovered dust size product is next transferred to conventional bag storage means 30 where the contained mass of collected material is then subjected to hydration employing water from a conventional supply means 32. The −40 mesh size material 34 desired for said heating element utilization is next transferred from said vibrating screen apparatus 22 to a conventional roasting oven 36 where heating of said material to elevated temperatures of approximately 1000° C. removes possible contaminants. Addition of silicon resin 38 to the desired size material follows said treatment and is conducted in a conventional blender means 40. While not specifically depicted in the accompanying drawing, optional magnetic separator means can also be included during processing of the disclosed fused magnesia material in the foregoing manner in order to assist with further removal of entrained contaminants. Final packaging of the desired size product employing conventional container means 42, such as barrels or bags, completes the above described processing method except for reprocessing of the undersize by-product material 44 resulting therefrom.

Recovery of the said by-product 44 contained in storage bag 30 first requires a sufficient time period to elapse for the hydrated magnesia to fracture in the bulk mass of collected material causing large size chunks or agglomerates to form. The observed time period for this result can range from several days to several months with chunks of the agglomerated material being produced ranging in size from approximately one-eighth inch up to approximately two inches in diameter. These agglomerates of the now hydrated magnesia particles can be directly charged to electric arc furnace 12 where the material become refused to a molten state and again forms a solid ingot having a varying polycrystalline composition when cooled in air to ambient temperatures. As can further be seen from the accompanying drawing, the refused magnesia is again processed in the same manner as hereinabove described for the originally fused material. Accordingly, the solid ingot of refused magnesia is processed sequentially in the identical equipment 16, 18, 20 and 22 to yield additional −40 mesh United States screen size material and with said now recovered material also being further processed in the roasting oven 36 and blender 40 to produce a free-flowing powder exhibiting electrical and physical properties substantially equivalent to the original product.

It will be apparent from the foregoing description that a broadly useful and novel method has been provided for recovery of undersized crystalline particulates capable of undergoing hydrolysis accompanied by significant heat generation. It is contemplated that the present recovery method can be applied to crystalline materials other than magnesia as well as carried out with processing equipment other than above specifically illustrated. For example, many other commercially available types of equipment can be used to effect size reduction of the particular crystalline material after fusion. Likewise, it is contemplated that size separation of the reduced crystalline material can be carried out with already known apparatus other than a vibrating screen assembly. Consequently, it is intended to limit the present invention only by the scope of the appended claims.

What we claim as new and desire to secure by Letters Patent of the United States is:

1. A process for recovery of pulverized magnesia particles produced by melting in an electric arc furnace having a purity level up to 99 weight percent and a particle size no greater than approximately 250 mesh United States screen size which comprises:

(a) collecting the magnesia particles in a flexible porous storage container, (b) percolating water at ordinary ambient temperature and without mechanical mixing throughout the bulk mass of collected material in an amount from approximately 5 weight percent up to approximately 50 weight percent of the bulk mass of material, (c) allowing sufficient time to elapse while the bulk mass of material remains in the storage container at ordinary ambient temperature to cause fracture in the bulk mass of material producing agglomerates ranging in size from approximately one-eighth inch up to approximately two inches, (d) removing the agglomerates from the storage container and remelting the agglomerates in an electric arc furnace, (e) cooling the remelted magnesia at ordinary ambient temperature to form a solid ingot, and (f) pulverizing the solid ingot to form remelted magnesia having a particle size of −40 mesh United states screen size.

2. The process of claim 1 wherein the remelted magnesia particles are coated with a lubricant after pulverizing to form a free-flowing powder.

* * * * *